United States Patent
Kamitani

(10) Patent No.: US 10,106,666 B2
(45) Date of Patent: Oct. 23, 2018

(54) CURABLE SILICONE RESIN COMPOSITION CONTAINING INORGANIC OXIDE AND OPTICAL MEMBER USING SAME

(71) Applicant: SAMSUNG ELECTRONICS CO., LTD., Suwon-si (KR)

(72) Inventor: Ryosuke Kamitani, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 15/370,452

(22) Filed: Dec. 6, 2016

(65) Prior Publication Data

US 2017/0253718 A1 Sep. 7, 2017

(30) Foreign Application Priority Data

Mar. 2, 2016 (JP) ................................. 2016-039769
Apr. 12, 2016 (KR) ........................ 10-2016-0044985

(51) Int. Cl.
| | | |
|---|---|---|
| C08K 3/22 | (2006.01) | |
| C08G 77/08 | (2006.01) | |
| C08G 77/44 | (2006.01) | |
| C08J 3/24 | (2006.01) | |
| G02B 1/04 | (2006.01) | |

(52) U.S. Cl.
CPC ................. *C08K 3/22* (2013.01); *C08G 77/08* (2013.01); *C08G 77/44* (2013.01); *C08J 3/247* (2013.01); *G02B 1/04* (2013.01); *C08J 2383/10* (2013.01); *C08K 2003/2244* (2013.01); *C08K 2201/003* (2013.01)

(58) Field of Classification Search
CPC ........... C08G 77/12; C08G 77/20; C08K 3/22
See application file for complete search history.

(56) References Cited

U.S. PATENT DOCUMENTS

| | | | |
|---|---|---|---|
| 3,715,293 A * | 2/1973 | Sandner | C07C 49/84 430/285.1 |
| 6,372,608 B1 | 4/2002 | Shimoda et al. | |
| 6,645,830 B2 | 11/2003 | Shimoda et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,345,319 B2 | 3/2008 | Okada | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,173,743 B2 | 5/2012 | Hirano | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 8,822,593 B2 | 9/2014 | Onai et al. | |

(Continued)

FOREIGN PATENT DOCUMENTS

| | | |
|---|---|---|
| JP | 2000-235103 A | 8/2000 |
| JP | 2008-120850 A | 5/2008 |

(Continued)

OTHER PUBLICATIONS

Ying Li, et al; "Bimodal "matrix-free" polymer nanocomposites"; RSC Advances; 2015; vol. 5; pp. 14788-14795.

*Primary Examiner* — Kuo Liang Peng
(74) *Attorney, Agent, or Firm* — Sughrue Mion, PLLC

(57) ABSTRACT

Provided is a curable silicone resin composition containing an inorganic oxide that may form an optical member having a relatively high refractive index and excellent optical transparency. The curable silicone resin composition may include a first curable silicone resin having a first functional group for surface bonding and a first crosslinkable functional group, a second curable silicone resin having a second functional group for surface bonding and a second crosslinkable functional group, and first and second inorganic oxide particles bonded to the first and second curable silicone resins by the first and second functional groups for surface bonding, respectively. The first and second crosslinkable functional groups may be bonded by applying energy.

20 Claims, No Drawings

(56) References Cited

U.S. PATENT DOCUMENTS

| | | | |
|---|---|---|---|
| 2007/0284687 A1* | 12/2007 | Rantala | H01L 21/02126 257/432 |
| 2010/0256312 A1 | 10/2010 | Ozaki et al. | |
| 2011/0248312 A1 | 10/2011 | Katayama | |
| 2013/0256742 A1 | 10/2013 | Harkness et al. | |
| 2014/0008697 A1 | 1/2014 | Harkness et al. | |
| 2014/0343233 A1 | 11/2014 | Benicewicz et al. | |
| 2015/0274973 A1 | 10/2015 | Bae et al. | |

FOREIGN PATENT DOCUMENTS

| | | |
|---|---|---|
| JP | 2009-7524 A | 1/2009 |
| JP | 2009-173757 A | 8/2009 |
| JP | 5162879 B2 | 3/2013 |
| JP | 2014-505748 A | 3/2014 |
| KR | 10-2012-0078300 A | 7/2012 |

* cited by examiner

CURABLE SILICONE RESIN COMPOSITION CONTAINING INORGANIC OXIDE AND OPTICAL MEMBER USING SAME

CROSS-REFERENCE TO RELATED APPLICATIONS

This application claims benefit to Korean Patent Application No. 10-2016-0044985, filed on Apr. 12, 2016 and Japanese Patent Application No. 2016-039769, filed on Mar. 2, 2016 in the Korean Intellectual Property Office, the disclosures of each of which are incorporated by reference herein in their entirety.

BACKGROUND

1. Field

The present disclosure relates to a curable silicone resin composition containing an inorganic oxide and an optical member using the same.

2. Description of Related Art

Light emitting diode (LED) devices commonly feature LED chips mounted therein. The LED chips are encapsulated within a transparent resin, such as an epoxy resin or a silicone resin, to protect the LED chips.

As epoxy resins for the encapsulation of LED chips, bisphenol A type epoxy resins having a phenyl group and cresol novolak type epoxy resins have been used. When these epoxy resins are used as encapsulation resins, radicals that may be generated by heat or light cause the encapsulation resins to be subject to oxidation degradation, resulting in yellowing. Thus, hydrogen-added epoxy resins having improved yellowing resistance may be used as epoxy resins for the encapsulation of LED chips. However, even when such epoxy resins are used as encapsulation resins, if the level of energy emitted by the LED chips increases due to the LED devices operating at short wavelengths and relatively high luminance, the encapsulation resins are still yellowed and thus reduce the luminance of the LED device.

Meanwhile, dimethyl silicone resins may also be used as silicone resins for the encapsulation of LED chips. Dimethyl silicone resins have excellent heat resistance and light resistance, as compared to epoxy resins. However, refractive indexes nD of dimethyl silicone resins are relatively low (about 1.4), and are less than those of LED chips. Thus, when light emitted by LED chips is received in dimethyl silicone resins at an angle less than the critical angle, the light is totally reflected at the interface with the dimethyl silicone resin. When total reflection occurs, the extraction efficiency of the light deteriorates, thereby reducing the luminance of the LED devices.

For this reason, in order to provide silicone resins having a relatively high refractive index, a method of using a silicone resin having a phenyl group is being examined. However, since phenyl groups absorb ultraviolet rays and thereby generate radicals, such encapsulation resins are subject to oxidation degradation when the LED devices operate at short wavelengths and will thus be yellowed, similar to the case of epoxy resins. Furthermore, when silicone resins having phenyl groups are used in high-power LED devices having an output of 1 W or more, the high-power LED devices deteriorate due to the heat that is generated.

In addition, in order for silicone resins to have a relatively high refractive index while maintaining heat resistance and light resistance, a method of mixing inorganic oxide particles, such as zirconia and the like, which have excellent thermal stability and relatively high refractive indexes, with a silicone resin is being considered.

SUMMARY

An aspect of the present disclosure may provide a curable silicone resin composition containing an inorganic oxide that may form an optical member having a relatively high refractive index and excellent optical transparency, and an optical member using the same.

According to another aspect of the present disclosure, a curable silicone resin composition containing an inorganic oxide may include: a first curable silicone resin having a first functional group for surface bonding and a first crosslinkable functional group; a second curable silicone resin having a second functional group for surface bonding and a second crosslinkable functional group; a first inorganic oxide particle having the first curable silicone resin bonded to a surface of the first inorganic oxide particle by the first functional group for surface bonding; and a second inorganic oxide particle having the second curable silicone resin bonded to a surface of the second inorganic oxide particle by the second functional group for surface bonding, in which the first and second crosslinkable functional groups are capable of bonding via the application of energy, and in which the average primary particle diameter of each of the first and second inorganic oxide particles may be from 1 nm to 40 nm.

According to an aspect of the present disclosure, an optical member may be obtained by curing the curable silicone resin composition containing an inorganic oxide by bonding the first crosslinkable functional group to the second crosslinkable functional group.

DETAILED DESCRIPTION

The present disclosure relates to a structure in which surfaces of inorganic oxide particles may be coated with particular silicone resins, and the inorganic oxide particles may be bonded to the silicon resins, which may then be cured, such that nanosized inorganic oxide particles may be uniformly dispersed in the silicon resin without being agglomerated.

In general, when inorganic oxide particles, such as zirconia, are mixed with a silicone resin, if the particle diameters of the inorganic oxide particles are several hundreds of nanometers (nm) or more, the difference between the refractive indexes of the inorganic oxide particles and the silicone resin may cause light scattering on the surfaces of the inorganic oxide particles, resulting in a cloudy mixture. In order to obtain a transparent mixture, the diameters of the inorganic oxide particles mixed with a silicone resin may be limited (for example, to several tens of nanometers (nm) or less). However, the surfaces of the inorganic oxide particles may generally be covered by hydroxyl groups, and may have a relatively high level of hydrophilicity. Thus, when the inorganic oxide particles having nanosizes and having diameters of several tens of nanometers (nm) or less are mixed with a hydrophobic material, such as a silicone resin, the inorganic oxide particles may become agglomerated and may not disperse uniformly. As a result, the mixture may be cloudy, and the degree of transparency required for an optical member may not be maintained.

In order to uniformly disperse inorganic oxide particles in a silicone resin without agglomeration, hydrophobizing surfaces of inorganic oxide particles via a surface treatment agent, such as a silane coupling agent, is frequently done.

However, when surfaces of the inorganic oxide particles are hydrophobized via a surface treatment agent, many hydroxyl groups, such as non-reactive hydroxyl groups on the surfaces, generated by steric inhibition of the surface treatment agent itself, and non-reactive hydroxyl groups, derived from a hydrolysate of the surface treatment agent, may remain. Thus, since the hydrophobization of the inorganic oxide particles may not completely succeed, when a hydrophobic material, such as a silicone resin, is mixed in, the inorganic oxide particles may still agglomerate.

Exemplary embodiments according to the present disclosure will hereinafter be described in detail. However, it should be understood that the present disclosure is not limited to the exemplary embodiments described below.

A. Curable Silicone Resin Composition Containing Inorganic Oxide

A curable silicone resin composition containing an inorganic oxide according to an exemplary embodiment may include a first curable silicone resin having a first functional group for surface bonding and a first crosslinkable functional group, a second curable silicone resin having a second functional group for surface bonding and a second crosslinkable functional group, a first inorganic oxide particle having the first curable silicone resin bonded to a surface of the first inorganic oxide particle by the first functional group for surface bonding, and a second inorganic oxide particle having the second curable silicone resin bonded to a surface of the second inorganic oxide particle by the second functional group for surface bonding. The first and second crosslinkable functional groups can be bonded by applying, for example, a predetermined level of energy.

The first and second inorganic oxide particles may be substantially identical or may be different. The first and second inorganic oxide particles may be inorganic oxide particles classified into different types according to functional groups or silicone resins.

The curable silicone resin composition containing an inorganic oxide according to an exemplary embodiment may also preferably include a catalyst that promotes the bonding of the first crosslinkable functional group of the first curable silicone resin to the second crosslinkable functional group of the second curable silicone resin.

Further, the curable silicone resin composition containing an inorganic oxide according to an exemplary embodiment may include a non-curable silicone resin having a third functional group for surface bonding. The non-curable silicone resin may be bonded to a surface of the first or second inorganic oxide particle by the third functional group for surface bonding. The non-curable silicone resin may or may not contain a crosslinkable functional group. By using the non-curable silicone resin, it is possible to control the hardness of an optical member formed using the curable silicone resin composition containing an inorganic oxide according to an exemplary embodiment.

Herein, the first to third functional groups for surface bonding may refer to functional groups participating in the bonding of any material to a surface of an inorganic oxide particle. At least a portion or the entirety of the first to third functional groups for surface bonding may be different or substantially identical to each other.

(1) Curable Silicone Resin

The first curable silicone resin may have a main silicone chain, the first functional group for surface bonding, and the first crosslinkable functional group bonded to the main silicone chain. Similarly, the second curable silicone resin may have a main silicone chain, the second functional group for surface bonding, and the second crosslinkable functional group bonded to the main silicone chain. The first and second functional groups for surface bonding may participate in the bonding of any material to the surfaces of the inorganic oxide particles.

The structures of the main silicone chains of the first and second curable silicone resins may be, for example, a dimethyl silicone structure, a dimethyl phenyl silicone structure, or a diphenyl silicone structure. The structures of the main silicone chains may also be a combination of those structures (for example, each of the main silicone chains may include a portion of a dimethyl silicone structure and a portion of a dimethyl phenyl silicone structure). The first and second curable silicone resins may have main silicone chains having substantially identical structures, and may also have main silicone chains having different structures. A first curable silicone resin having a main silicone chain containing a single type of structure may be bonded to a single first inorganic oxide particle. Alternatively, a first curable silicone resin having a main silicone chain containing a more than one type of structure may be bonded to a single first inorganic oxide particle. Similarly, a second curable silicone resin having a main silicone chain containing a single type of structure may be bonded to a single second inorganic oxide particle. Or, a second curable silicone resin having a main silicone chain containing more than one type of structure may be bonded to a single second inorganic oxide particle.

By applying a predetermined level of energy to the curable silicone resin composition containing an inorganic oxide, the first crosslinkable functional group of the first curable silicone resin may be bonded to the second crosslinkable functional group of the second curable silicone resin. The first and second crosslinkable functional groups may be, respectively, a hydrosilyl group and a vinyl group, an epoxy group and an acid anhydride group, or an acrylic group and an acrylic group. The first and second crosslinkable functional groups of the curable silicone resin composition containing an inorganic oxide may be preferably present in a substantially identical molar amount. The bonding locations of the first and second crosslinkable functional groups to the main silicone chains may be the distal ends of the main silicone chains, and may also be the centers of the main silicone chains other than the distal ends.

The first and second curable silicone resins may be bonded to the surfaces of the first and second inorganic oxide particles via the first and second functional groups for surface bonding, respectively. The first and second functional groups for surface bonding may be bonded to hydroxyl groups on the surfaces of the first and second inorganic oxide particles. For example, the first and second functional groups for surface bonding may be carboxylic groups, sulfonyl groups, or phosphate groups. When these groups are used as functional groups for surface bonding, the curable silicone resin composition containing an inorganic oxide may be easily made transparent. The first and second functional groups for surface bonding may be substantially identical or different from each other. Further, the first curable silicone resin having substantially identical functional groups for surface bonding may be bonded to the first inorganic oxide particle. A first curable silicone resin having different types of functional groups for surface bonding may also be bonded to the first inorganic oxide particle. Similarly, the second curable silicone resin having substantially identical functional groups for surface bonding, or the second curable silicone resin having different types of functional groups for surface bonding may be bonded to the second inorganic oxide particle. The bonding locations of the first and second functional groups for surface bonding to the main silicone chains may be the distal ends of the main silicone chains, and may also be the center of the main silicone chains other than the distal ends.

The viscosities of the first and second curable silicone resins may preferably be from 0.001 Pa·s to 10 Pa·s, and more preferably, may be from 0.005 Pas to 1 Pa·s. When the viscosities are greater than 10 Pa·s, it is possible that the curable silicone resin composition containing an inorganic oxide will not remain in a liquid state. When the viscosities are less than 0.001 Pa·s, it may be difficult to disperse the inorganic oxide particles. Further, when the viscosities are less than 0.005 Pa·s, this may cause the curable silicone resins to become volatile. The viscosity of the non-curable silicone resin may be controlled by controlling the molecular weight of the non-curable silicone resin. For example, a non-curable silicone resin may be used that has a molecular weight that provides for a viscosity of from 0.001 Pa·s to 10 Pa·s.

(2) Inorganic Oxide Particle

The inorganic oxide particles may be characterized as first and second inorganic oxide particles according to the types of bonded functional groups or silicone resins.

The average primary particle diameter of the inorganic oxide particles may range from 1 nm to 40 nm, preferably from 1 nm to 10 nm, and more preferably from 1 nm to 5 nm. When the average primary particle diameter is greater than 40 nm, it may be likely that Rayleigh scattering will occur. 1 nm may be the lower limit of the size of the inorganic oxide particles that are present.

The inorganic oxide particles may be used when they are dispersed in an organic solvent, without being agglomerated.

At least one of zirconia, titania, ceria, and barium titanate may be used as the inorganic oxide particles.

The first and second inorganic oxide particles, having the first curable silicone resin bound thereto and the second curable silicone resin bonded thereto, may be substantially identical inorganic oxides, or may be different inorganic oxides.

As such, the inorganic oxide particles may be divided into inorganic oxide particles that have the first curable silicone resin bonded to a surface thereof and inorganic oxide particles having the second curable silicone resin bonded to a surface thereof. In amounts in which a refractive index, optical transparency, and hardness of the optical member are not affected, the second curable silicone resin may be bonded to the first inorganic oxide particle having the first curable silicone resin bonded to the surface thereof, and the first curable silicone resin may also be bonded to the second inorganic oxide particle having the second curable silicone resin bonded to the surface thereof.

(3) Catalyst

The catalyst that is used will depend on the combination of the first and second crosslinkable functional groups.

When the combination of the first and second crosslinkable functional groups is a hydrosilyl group and a vinyl group, a catalyst that promotes a hydrosilylation reaction may be used. Catalysts of this nature that are activated by heat include platinum (Pt) and palladium (Pd). Since platinum (Pt) is colorless and transparent after a hydrosilylation reaction, it is preferably used as the catalyst that promotes a hydrosilylation reaction.

When the combination of the first and second crosslinkable functional groups is an epoxy group and an acid anhydride group, a catalyst that promotes a polymerization reaction may be used. The catalyst that promotes a polymerization reaction may be a tertiary amine, a tertiary salt, an imidazole, or a phosphine.

When the combination of the first and second crosslinkable functional groups is an acrylic group and an acrylic group, a catalyst that promotes a radical reaction may be used. The catalyst that promotes a radical reaction may be an azo compound or a peroxide.

(4) Non-Curable Silicone Resin

The non-curable silicone resin may have a main silicone chain, and may include a third functional group for surface bonding bonded to the main silicone chain. The third functional group for surface bonding of the non-curable silicone resin may participate in the bonding of any material to a surface of an inorganic oxide particle (which may be, for example, at least one of the first and second inorganic oxide particles).

The structure of the main silicone chain of the non-curable silicone resin may be, for example, a dimethyl silicone structure, a dimethyl phenyl silicone structure, or a diphenyl silicone structure. The structure of the main silicone chain may also be a combination of the above-mentioned structures (for example, the main silicone chain may include a dimethyl silicone structure portion and a dimethyl phenyl silicone structure portion). A non-curable silicone resin having a main silicone chain containing a single type of structure may be bonded to a single inorganic oxide particle. A non-curable silicone resin having a main silicone chain containing different types of structures may also be bonded to the single inorganic oxide particle.

The non-curable silicone resin may be bonded to the surface of at least one of the first and second inorganic oxide particle via the third functional group for surface bonding. Such a functional group for surface bonding may be a carboxylic group, a sulfonyl group, or a phosphate group. A non-curable silicone resin having a single type of functional group for surface bonding may be bonded to a single inorganic oxide particle. In addition, a non-curable silicone resin containing different types of functional groups for surface bonding may be bonded to the single inorganic oxide particle.

The non-curable silicone resin may include a plurality of resins having different molecular weights.

As described above, a third inorganic oxide particle may be substantially identical to the first and second inorganic oxide particles. At least one of the first and second curable silicone resins may be bonded to the third inorganic oxide particle having the non-curable silicone resin bonded thereto, and vice versa. For example, the non-curable silicone resin may be bonded to at least one of the first and second inorganic oxide particles.

(5) Application of Energy

A predetermined level of energy may be applied when the curable silicone resin composition containing an inorganic oxide according to an exemplary embodiment is cured. The application of energy may be performed using a heating or heat irradiation process. When the optical member, formed using the curable silicone resin composition containing an inorganic oxide according to an exemplary embodiment, is used as an encapsulation resin for a light emitting diode (LED) chip mounted in an LED device, the application of energy may preferably be performed using a heating process.

(6) Contents of Inorganic Oxide Particles and Silicone Resin

The contents of the inorganic oxide particles (for example, the first and second inorganic oxide particles) and the silicone resins (for example, the first curable silicone resin, the second curable silicone resin, and the non-curable silicone resin) of the curable silicone resin composition containing an inorganic oxide according to an exemplary embodiment, may be determined as follows.

First, a desired value of the refractive index of the optical member, formed using the curable silicone resin composition containing an inorganic oxide according to an example embodiment, may be determined.

When the desired value is determined, the volume ratios (vol %) of the inorganic oxide particles required to reach the desired value of the refractive index may be determined.

These volume ratios (vol %) may depend on the types of the silicone resins that are used (for example, the first curable silicone resin, the second curable silicone resin, and the non-curable silicone resin).

When the volume ratios (vol %) are determined, the contents (wt %) of the inorganic oxide particles required to secure the volume ratio (vol %) may be determined.

When the contents (wt %) of the inorganic oxide particles are determined, the molecular weight and content (wt %) of each of the first and second curable silicone resins may be controlled to secure the volume ratios (vol %) required for the inorganic oxide particles. When a non-curable silicone resin is used, the molecular weight and content (wt %) of the non-curable silicone resin may also be controlled. When the non-curable silicone resin includes a plurality of resins having different molecular weights, the molecular weight and content (wt %) of an individual resin forming the non-curable silicone resin may also be controlled.

When the molecular weights of the silicone resins increase, the contents (wt %) of the inorganic oxide particles may not be raised. In contrast, when the molecular weights of the silicone resins decrease, the contents (wt %) of the inorganic oxide particles may be raised, but the fluidity of the curable silicone resin composition containing an inorganic oxide may be reduced. When only the first and second curable silicone resins are used without use of a non-curable silicone resin, the optical member, formed using the curable silicone resin composition containing an inorganic oxide, may also be made excessively firm. When the volume ratios (vol %) of the inorganic oxide particles are identical to each other, the molecular weights of the silicone resins may also be required to be increased according to an increase in the particle diameters of the inorganic oxide particles. When an optical member, formed using the curable silicone resin composition containing an inorganic oxide according to an exemplary embodiment, is used as the encapsulation resin for a LED chip mounted in a LED device, the viscosities of the silicone resins may preferably be within the range of from 1 Pa·s to 10 Pa·s, which is generally used for the encapsulation of LED chips. Considering these points, the molecular weight and content (wt %) of each of the first and second curable silicone resins, the molecular weight and content (wt %) of the non-curable silicone resin, and the molecular weight and content (wt %) of the individual resin forming the non-curable silicone resin, may be controlled.

In an exemplary embodiment described below, the desired value of the refractive index of the optical member may be 1.51. To reach a refractive index of 1.51, zirconia particles may be required to be present in an amount of 18 vol % or more. To include the zirconia particles in an amount of 18 vol % or more, the silicone resins may need to be included in an amount of 50 wt % or more. Thus, 100 g of zirconia particles, 54 g of the first curable silicone resin having a number average molecular weight of about 6,000, 54 g of the second curable silicone resin having a number average molecular weight of 10,000, 16 g of the non-curable silicone resin having a number average molecular weight of 10,000, and 20 g of the non-curable silicone resin having a number average molecular weight of 1,000, may be used. The content of the zirconia particles may therefore be 52.6 wt %.

B. Optical Member

An optical member according to an exemplary embodiment may be obtained by curing the above-mentioned curable silicone resin composition containing an inorganic oxide by bonding the first crosslinkable functional group of the first curable silicone resin to the second crosslinkable functional group of the second curable silicone resin.

By applying a predetermined level of energy to the curable silicone resin composition containing an inorganic oxide, the first crosslinkable functional group of the first curable silicone resin may be bonded to the second crosslinkable functional group of the second curable silicone resin.

The optical member may preferably include the inorganic oxide particles in a volume ratio (vol %) of 10 vol % or more, and more preferably in a volume ratio (vol %) of 15 vol % or more. When the volume ratio (vol %) of the inorganic oxide particles is 10 vol % or more, the refractive index of the optical member may be fully increased.

The total light transmittance of the optical member at a wavelength from 400 nm to 800 nm may preferably be 60% or more, and may more preferably be 80% or more.

In the related art, in a method of mixing surface-coated inorganic oxide particles with silicone resins that form a matrix, the distances between inorganic oxide particles included in an optical member may be non-uniform due to the presence of the matrix. By contrast, a curable silicone resin composition containing an inorganic oxide according to an exemplary embodiment herein may be obtained by mixing the inorganic oxide particles, the surfaces of which are coated with the first curable silicone resin having the first crosslinkable functional group, with the inorganic oxide particles, the surfaces of which are coated with the second curable silicone resin having the second crosslinkable functional group. Thus, the inorganic oxide particles of the optical member, formed using the curable silicone resin composition containing an inorganic oxide, may be bonded by the first and second curable silicone resins.

As a result, the difference in distances between inorganic oxide particles may be less.

The curable silicone resin composition containing an inorganic oxide according to an exemplary embodiment may also include an oxidation degradation inhibitor, a phosphor, or other additives in amounts such that the refractive index, optical transparency, and hardness of the optical member are not affected.

C. Method of Manufacturing Curable Silicone Resin Composition Containing Inorganic Oxide and Optical Member A curable silicone resin composition containing an inorganic oxide and the optical member according to an exemplary embodiment may be manufactured by performing a first curable silicone resin formation process that includes forming the first curable silicone resin having the first functional group for surface bonding and the first crosslinkable functional group; a second curable silicone resin formation process that includes forming the second curable silicone resin having the second functional group for surface bonding and the second crosslinkable functional group; a particle dispersion (liquid) formation process that includes forming an inorganic oxide particle dispersion; a first curable silicone resin-coated particle formation process that includes forming the first inorganic oxide particle coated with the first curable silicone resin by adding the first curable silicone resin to the inorganic oxide particle dispersion and bonding the first curable silicone resin to the surfaces of the inorganic oxide particles; a first curable silicone resin-coated particle dispersion formation process that includes forming a first inorganic oxide particle dispersion coated with the first curable silicone resin; a second curable silicone resin-coated particle formation process that includes forming the second inorganic oxide particle coated with the second curable silicone resin by adding the second curable silicone resin to the inorganic oxide particle dispersion and bonding the second curable silicone resin to the surfaces of the inorganic oxide particles; a second curable silicone resin-coated particle dispersion formation process that includes forming a second inorganic oxide particle dispersion coated with the second curable silicone resin; a gel material formation process that includes forming a gel material by mixing the first inorganic oxide particle dispersion, coated with the first curable silicone resin, with the second inorganic oxide particle dispersion, coated with the second curable silicone resin, and by distilling a solvent from the mixture; and a cured material formation process that includes forming a cured material by bonding the first crosslinkable functional group of the first curable silicone resin to the second crosslinkable functional group of the second curable silicone resin by applying a predetermined level of energy to the gel material. The gel material obtained by the gel material formation process may correspond to the curable silicone resin composition containing an inorganic oxide, and the cured material obtained by the cured material formation process may correspond to the optical member.

Also, in order to promote bonding of the first crosslinkable functional group of the first curable silicone resin to the second crosslinkable functional group of the second curable silicone resin, a catalyst may be added in the gel material formation process.

Further, when the curable silicone resin composition containing an inorganic oxide according to an exemplary embodiment includes a non-curable silicone resin having a third functional group for surface bonding, a non-curable silicone resin formation process that includes forming the non-curable silicone resin having the third functional group for surface bonding may be performed. The first curable silicone resin-coated particle formation process may allow the non-curable silicone resin to be added to the inorganic oxide particle dispersion together with the first curable silicone resin, and the non-curable silicone resin to be bonded to the surface of the second inorganic oxide particle bonded to the first curable silicone resin. Similarly, the second curable silicone resin-coated particle formation process may allow the non-curable silicone resin to be added to the inorganic oxide particle dispersion together with the second curable silicone resin, and the non-curable silicone resin to be bonded to the surface of the second inorganic oxide particle, to which the second curable silicone resin may be bonded.

Below is an example of a method of manufacturing a curable silicone resin composition having an inorganic oxide and an optical member for an exemplary embodiment using a phosphate group as the functional group for surface bonding, a hydrosilyl group as the first crosslinkable functional group, and a vinyl group as the second crosslinkable functional group, using a catalyst and a non-curable silicone resin, and further applying a predetermined level of energy using a heating process.

(1) First Curable Silicone Resin Formation Process

The first curable silicone resin formation process may form a first curable silicone resin having a phosphate group and a hydrosilyl group.

In this process, a silicone resin having hydrosilyl groups at both distal ends thereof may be dissolved in a solvent. A vinylphosphonic acid may be added to the solution. For example, 0.5 equivalents of vinylphosphonic acid may be added with respect to the hydrosilyl groups. Further, a catalyst that promotes a hydrosilylation reaction may be added to the solution. Subsequently, the solution may be stirred at a certain temperature so as to bond a hydrosilyl group in the silicone resin to the vinyl group in the vinylphosphonic acid. Then, a precipitate may be extracted from the solution to thereby obtain the first curable silicone resin having a phosphate group at one distal end thereof and a hydrosilyl group at the other distal end thereof.

(2) Second Curable Silicone Resin Formation Process

The second curable silicone resin formation process may form a second curable silicone resin having a phosphate group and a vinyl group.

In this process, a silicone resin having a hydrosilyl group at one distal end thereof and a vinyl group at the other distal end thereof may be dissolved in a solvent. A vinylphosphonic acid may be added to the solution. For example, 5.0 equivalents of vinylphosphonic acid may be added with respect to the hydrosilyl groups. Further, a catalyst that promotes a hydrosilylation reaction may be added to the solution. Subsequently, the solution may be stirred at a certain temperature so as to bond the hydrosilyl group of the silicone resin to the vinyl group of the vinylphosphonic acid. Then, a precipitate may be extracted from the solution to thereby obtain the second curable silicone resin having a phosphate group at one distal end thereof and a vinyl group at the other distal end thereof.

(3) Non-Curable Silicone Resin Formation Process

The non-curable silicone resin formation process may form a non-curable silicone resin having a phosphate group.

In this process, a silicone resin having a methylol group at a distal end thereof may be dissolved in a solvent. A phosphoryl chloride may be added to the solution. The phosphoryl chloride may be added in an excessive amount with respect to the methylol groups. Subsequently, the solution may be stirred at a certain temperature so as to bond the methylol group of the silicone resin to the phosphoryl chloride. Then, water may be added to the solution, and a non-reactive chlorine group of the phosphoryl chloride may be substituted with a hydroxyl group. Then, a precipitate may be extracted from the solution to thereby obtain the non-curable silicone resin having a phosphate group at a distal end thereof.

(4) Particle Dispersion Formation Process

The particle dispersion formation process may form an inorganic oxide particle dispersion.

In this process, an inorganic oxide particle dispersion, in which inorganic oxide particles having an average primary particle diameter of from 1 nm to 40 nm are dispersed in a certain organic solvent, may be prepared. An aliphatic carboxylic acid may be added to the inorganic oxide particle dispersion. Subsequently, the inorganic oxide particle dispersion may be stirred at a certain temperature, and the aliphatic carboxylic acid may be bonded to the surfaces of the inorganic oxide particles. Then, a precipitate may be extracted from the inorganic oxide particle dispersion, and a solvent may be added to the extracted precipitate to thereby obtain the inorganic oxide particle dispersion coated with the aliphatic carboxylic acid.

(5) First Curable Silicone Resin-Coated Particle Formation Process

The first curable silicone resin-coated particle formation process may form a first inorganic oxide particle coated with the first curable silicone resin by adding the first curable silicone resin and the non-curable silicone resin to the inorganic oxide particle dispersion and binding the first curable silicone resin and the non-curable silicone resin to the surfaces of the inorganic oxide particles.

In this process, the first curable silicone resin and the non-curable silicone resin may first be added to the inorganic oxide particle dispersion coated with the aliphatic carboxylic acid. Subsequently, the inorganic oxide particle dispersion may be stirred at a certain temperature, and the first curable silicone resin and the non-curable silicone resin may be bonded to the surfaces of the inorganic oxide particles by the phosphate groups of the first curable silicone resin and the non-curable silicone resin. Then, a precipitate may be extracted from the inorganic oxide particle dispersion to thereby obtain the first inorganic oxide particle coated with the first curable silicone resin.

(6) First Curable Silicone Resin-Coated Particle Dispersion Formation Process

The first curable silicone resin-coated particle dispersion formation process may form a first inorganic oxide particle dispersion coated with the first curable silicone resin.

In this process, the inorganic oxide particles coated with the first curable silicone resin may be added to a solvent to thus obtain the first inorganic oxide particle dispersion coated with the first curable silicone resin.

(7) Second Curable Silicone Resin-Coated Particle Formation Process

The second curable silicone resin-coated particle formation process may form a second inorganic oxide particle coated with the second curable silicone resin by adding the second curable silicone resin to the inorganic oxide particle dispersion and binding the second curable silicone resin to the surfaces of the inorganic oxide particles.

This process may be conducted in the same manner as the abovementioned first curable silicone resin-coated particle formation process.

(8) Second Curable Silicone Resin-Coated Particle Dispersion Formation Process

The second curable silicone resin-coated particle dispersion formation process may form a second inorganic oxide particle dispersion coated with the second curable silicone resin.

This process may be conducted in the same manner as the abovementioned first curable silicone resin-coated particle dispersion formation process.

(9) Gel Material Formation Process

The gel material formation process may form a gel material by mixing the first inorganic oxide particle dispersion, coated with the first curable silicone resin, with the second inorganic oxide particle dispersion, coated with the second curable silicone resin, and by distilling a solvent from the mixture.

In this process, the first inorganic oxide particle dispersion coated with the first curable silicone resin may be first mixed with the second inorganic oxide particle dispersion coated with the second curable silicone resin. Here, the first inorganic oxide particle coated with the first curable silicone resin may be mixed with the second inorganic oxide particle coated with the second curable silicone resin at a certain mixing ratio. In addition, a catalyst that promotes a hydrosilylation reaction may be added to the mixture. Subsequently, the mixture may be stirred until mixed evenly. Then, solvent may be distilled from the mixture to thus obtain the gel material.

(10) Cured Material Formation Process

The cured material formation process may form a cured material by binding the first crosslinkable functional group of the first curable silicone resin to the second crosslinkable functional group of the second curable silicone resin by heating the gel material.

In this process, the gel material may be heated to a certain temperature, and the hydrosilyl group of the first curable silicone resin and the vinyl group of the second curable silicone resin may be bonded to thus obtain the cured material.

D. Effects

In related art, which uses a method of mixing surface-coated inorganic oxide particles and silicone resins that form a matrix, the inorganic oxide particles may be uniformly dispersed in the silicone resins that form the matrix when the inorganic oxide particles including the first and second inorganic oxide particles have a relatively low concentration of about 1 wt % to about 20 wt %. However, when the inorganic oxide particles have a relatively high concentration of 20 wt % or more, the distances between inorganic oxide particles may be reduced, resulting in an increase in van der Waals forces between the inorganic oxide particles and agglomeration of the inorganic oxide particles. Thus, other methods in the art may not allow for a relatively high concentration of inorganic oxide particles to be evenly dispersed, and may cause such a mixture to be cloudy.

By contrast, a curable silicone resin composition containing an inorganic oxide according to an exemplary embodiment herein may include a first inorganic oxide particle having a first curable silicone resin bonded to the surface thereof by a first functional group for surface bonding and a second inorganic oxide particle having a second curable silicone resin bonded to the surface thereof by a second functional group for surface bonding. The first curable silicone resin may have a first crosslinkable functional group, and the second curable silicone resin may have a second crosslinkable functional group. The first and second crosslinkable functional groups may be bonded by applying a predetermined level of energy. An average primary particle diameter of the inorganic oxide particles may range from 1 nm to 40 nm. Thus, the curable silicone resin composition containing an inorganic oxide may be cured by crosslinking the first curable silicone resin to the second curable silicone resin by bonding the first crosslinkable functional groups to the second crosslinkable functional groups. The first and second inorganic oxide particles may be bonded by the first and second curable silicone resins.

As such, a curable silicone resin composition containing an inorganic oxide according to an exemplary embodiment herein may be obtained by mixing a first inorganic oxide particle, the surface of which is coated with the first curable silicone resin having the first crosslinkable functional group, with a second inorganic oxide particle, the surface of which is coated with the second curable silicone resin having the second crosslinkable functional group, and the silicone resins that form the matrix may not be used. Thus, the inorganic oxide particles may be present in a relatively high concentration of 50 wt % or more. Also, since the silicone resins that form the matrix are not used, even when the entire inorganic oxide particles have a relatively high concentration of 50 wt % or more, the surfaces of the inorganic oxide particles may be fully coated with the silicone resins, thus preventing the inorganic oxide particles from becoming agglomerated. Thus, in an exemplary embodiment, a transparent curable silicone resin composition containing an inorganic oxide in which inorganic oxide particles in a relatively high concentration are evenly dispersed may be obtained.

The optical member according to an exemplary embodiment may also be obtained by curing the abovementioned curable silicone resin composition containing an inorganic oxide by bonding the first crosslinkable functional group to the second crosslinkable functional group. Thus, because the inorganic oxide particles having a nanometer scale size may be uniformly dispersed in the silicone resin at the relatively high concentration, an optical member having a relatively high refractive index and excellent optical transparency may be obtained.

Further, use of the optical member according to an exemplary embodiment as an encapsulation resin for an LED chip mounted in an LED device may allow for the difference between the refractive indexes of the optical member and the LED chip to be reduced. Further, the degree of reflection when light emitted by the LED chip is received in the encapsulation resin may be reduced, thus increasing the light extraction efficiency. As a result, the luminance of the LED device may be increased.

EXAMPLES

Examples and Comparative Examples are provided below. The Examples below represent exemplary embodiments of the present disclosure, but the present disclosure is not limited thereto.

Prior to descriptions of the Examples and Comparative Examples, various measurement methods will be described.

<Method of Measuring Refractive Index>

Refractive index was measured by an ABE refractometer (ATAGO Co., LTD., DR-M2), based on JISK7142, "method of measuring refractive index of plastics".

<Method of Measuring Total Light Transmittance>

Total light transmittance was measured by a hazemeter (Nippon Denshoku Industries Co., Ltd., NDH 7000), based on JISK7361, "method of testing total light transmittance of a plastic-transparent material".

Preparation Example 1

Preparation Example 1 describes a method of manufacturing a first curable silicone resin having a phosphate group and a hydrosilyl group.

First, 10 g of silicone resin (Gelest Inc., DMS-H21) having a number average molecular weight of 6,000, and having hydrosilyl groups at both distal ends thereof was added to 100 ml of tetrahydrofuran (THF) within a reaction vessel to be dissolved in the THF. Then, 180 mg of vinylphosphonic acid (Tokyo Chemical Industry Co., Ltd.) was added to the solution. For example, 0.5 equivalents of the vinylphosphonic acid was added with respect to the hydrosilyl groups. Subsequently, the solution was uniformly stirred, and then a Karstedt catalyst was added to the solution such that a concentration of platinum (Pt) was 50 ppm with respect to the silicone resin. Then, the solution was stirred at 70° C. for a period of 12 hours, and the hydrosilyl groups of the silicone resin and a vinyl group of the vinylphosphonic acid were bonded. After termination of the reaction, solvent was distilled from the solution at 40° C. under a vacuum atmosphere. Then, methanol was added to the solution to clean the precipitate. The methanol used for the cleaning was subsequently discarded to thus obtain the first curable silicone resin having the phosphate group at one distal end thereof and the hydrosilyl group at the other distal end thereof.

Preparation Example 2

Preparation Example 2 describes a method of manufacturing a second curable silicone resin having a phosphate group and a vinyl group.

First, 10 g of silicone resin (Gelest Inc., DMS-HV22) having a number average molecular weight of 10,000, and having a hydrosilyl group at one distal end thereof and a vinyl group at the other distal end thereof was added to 100 ml of tetrahydrofuran (THF) to be dissolved in the THF. Then, 540 mg of vinylphosphonic acid (Tokyo Chemical Industry Co., Ltd.) was added to the solution. For example, 5.0 equivalents of the vinylphosphonic acid was added with respect to the hydrosilyl group. Subsequently, the solution was uniformly stirred, and a Karstedt catalyst was added to the solution such that a concentration of platinum (Pt) was 50 ppm with respect to the silicone resin. Then, the solution was stirred at 70° C. for a period of 12 hours, and the hydrosilyl group of the silicone resin and a vinyl group of the vinylphosphonic acid were bonded. After termination of the reaction, a solvent was distilled from the solution at 40° C. under a vacuum atmosphere. Then, methanol was added to the solution to clean a precipitate. The methanol used for the cleaning was subsequently discarded to thus obtain the second curable silicone resin having the phosphate group at one distal end thereof and the vinyl group at the other distal end thereof.

Preparation Example 3

Preparation Example 3 describes a method of manufacturing a non-curable silicone resin having a phosphate group. The description below is based on a method described in *Langmuir* 2013, 29, 1211, the contents of which are incorporated herein by reference.

First, 20 g of a silicone resin (Gelest Inc., MCR-C12) having a methylol group at a distal end thereof was added to 100 ml of a toluene within a reaction vessel to be dissolved in the toluene. Empty space within the reaction vessel was substituted with nitrogen, and 2.5 ml of triethylamine was added to the solution. Further, 2.0 ml of phosphoryl chloride was added to the solution under an ice cooling atmosphere. The phosphoryl chloride was added in an excessive amount with respect to the methylol group. Subsequently, the solution was returned to room temperature and stirred for 3 hours to react the methylol group of the silicone resin with a chlorine group of the phosphoryl chloride. Then, 10 ml of pure water was added to the solution to substitute a non-reactive chlorine group of the phosphoryl chloride with a hydroxyl group. The toluene layer was cleaned by a liquid separating process using pure water, and a hydrolysate of the phosphoryl chloride added in the excessive amount and triethylamine hydrochloride was removed from the toluene layer. The non-curable silicone resin having a number average molecular weight of 1,000, and having a phosphate group at a distal end thereof was obtained by removing solvent from the toluene layer at 40° C. under a vacuum atmosphere.

In addition, except for changing amounts of the added triethylamine and added phosphoryl chloride to 0.5 ml and 0.4 ml, respectively, a non-curable silicone resin having a number average molecular weight of 10,000, and having a phosphate group at a distal end thereof was obtained by the same method.

Preparation Example 4

Preparation Example 4 describes a method of manufacturing a zirconia particle dispersion.

First, 50 ml of toluene and 15 ml of n-octanoic acid was added to 100 ml of a methanol solution (Sakai Chemical Industry Co., LTD., SZR-M), in which 30 wt % of zirconia particles having an average primary particle diameter of 3 nm to 4 nm was included in a dispersed state within a reaction vessel. Then, the solution was stirred at 50° C. for a period of 12 hours to bond the n-octanoic acid to surfaces of the zirconia particles by a carboxylic group of the n-octanoic acid. After termination of the reaction, a solvent was distilled from the solution at 40° C. under a vacuum atmosphere. Subsequently, methanol was added to the solution to clean the precipitate. Then, the methanol used for the cleaning was discarded to obtain the zirconia particles coated with the n-octanoic acid. Then, 100 ml of a toluene was added to the obtained zirconia particles to thus obtain the zirconia particle dispersion coated with n-octanoic acid.

Synthesis Example 1

Synthesis Example 1 describes a method of synthesizing a zirconia particle dispersion coated with the first curable silicone resin and the non-curable silicone resin.

First, 54 g of the first curable silicone resin obtained in Preparation Example 1, 16 g of the non-curable silicone resin having a number average molecular weight of 10,000 obtained in Preparation Example 3, and 20 g of the non-curable silicone resin having a number average molecular weight of 1,000 obtained in Preparation Example 3, was added to 100 g of the zirconia particle dispersion obtained in Preparation Example 4 within a reaction vessel. Then, the solution was stirred at 70° C. for a period of 12 hours, and the n-octanoic acid bonded to the surfaces of the zirconia particles was substituted with the first curable silicone resin, the non-curable silicone resin having a number average molecular weight of 10,000, and the non-curable silicone resin having a number average molecular weight of 1,000. The first curable silicone resin and the non-curable silicone resin was bonded to the surfaces of the zirconia particles by the phosphate groups thereof. After termination of the reaction, solvent was distilled from the solution at 40° C. under a vacuum atmosphere. Subsequently, methanol was added to the solution to clean the precipitate. Then, the methanol used for cleaning was discarded to thus obtain the zirconia particle dispersion coated with the first curable silicone resin, the non-curable silicone resin having a number average molecular weight of 10,000, and the non-curable silicone resin having 1,000.

Synthesis Example 2

Synthesis Example 2 describes a method of synthesizing a zirconia particle dispersion coated with the second curable silicone resin and the non-curable silicone resin.

First, 54 g of the second curable silicone resin obtained in Preparation Example 2, 16 g of the non-curable silicone resin having a number average molecular weight of 10,000 obtained in Preparation Example 3, and 20 g of the non-curable silicone resin having a number average molecular weight of 1,000 obtained in Preparation Example 3, was added to 100 g of the zirconia particle dispersion obtained in Preparation Example 4 within a reaction vessel. Except for the steps above, the zirconia particle dispersion coated with the second curable silicone resin, the non-curable silicone resin having a number average molecular weight of 10,000, and the non-curable silicone resin having 1,000, was obtained in the same manner as Synthesis Example 1.

Synthesis Example 3

Synthesis Example 3 describes a method of synthesizing a zirconia particle dispersion coated with the non-curable silicone resin.

First, 80 g of the non-curable silicone resin having a number average molecular weight of 10,000 obtained in Preparation Example 3 and 20 g of the non-curable silicone resin having a number average molecular weight of 1,000 obtained in Preparation Example 3, was added to 100 g of the zirconia particle dispersion obtained in Preparation Example 4 within a reaction vessel. Except for the steps above, the zirconia particle dispersion coated with the non-curable silicone resin having a number average molecular weight of 10,000 and the non-curable silicone resin having a number average molecular weight of 1,000, was obtained in the same manner as Synthesis Example 1.

Table 1 below shows the raw materials used in Synthesis Examples 1 through 3.

TABLE 1

| Compound Name | Zirconia Particles coated with n-Octanoic Acid | First Curable Silicone Resin | Second Curable Silicone Resin | Non-curable Silicone Resin | Non-curable Silicone Resin |
|---|---|---|---|---|---|
| Synthesis Example 1 | 100 | 54 | — | 16 | 20 |
| Synthesis Example 2 | | — | 54 | 16 | 20 |
| Synthesis Example 3 | | — | — | 80 | 20 |

Example 1

First, the zirconia particle dispersion coated with the first curable silicone resin, the non-curable silicone resin having a number average molecular weight of 10,000, and the non-curable silicone resin having a number average molecular weight of 1,000 obtained in Synthesis Example 1, and the zirconia particle dispersion coated with the second curable silicone resin, the non-curable silicone resin having a number average molecular weight of 10,000, and the non-curable silicone resin having a number average molecular weight of 1,000 obtained in Synthesis Example 2, was mixed within a reaction vessel. The mixing was conducted such that a solid content of the zirconia particle dispersion obtained in Synthesis Example 1 and a solid content of the zirconia particle dispersion obtained in Synthesis Example 2 are 1 g, respectively. Further, a Karstedt catalyst was added such that a concentration of platinum (Pt) was 50 ppm with respect to the entirety of the solids. Subsequently, the mixture was stirred using a revolving and rotating mixer until mixed evenly. Then, solvent was distilled from the mixture at 40° C. under a vacuum atmosphere to obtain a colorless, transparent gel material. The obtained gel material was heated at 150° C. for 1 hour, and the hydrosilyl group of the first curable silicone resin was bonded to the vinyl group of the second curable silicone resin to obtain a colorless, transparent cured material.

The refractive index nD of the obtained cured material was 1.51. Main chains of the first curable silicone resin, the second curable silicone resin, and the non-curable silicone resin used in Example 1 may have a dimethyl silicone structure. Since a refractive index nD of a dimethyl silicone resin is 1.41, the cured material obtained in Example 1 may be recognized as having an increased refractive index by including the zirconia particles.

Example 1 may also implement a refractive index equivalent to that of a phenyl silicone resin using the silicone resins having the dimethyl silicone structure. Thus, when the cured material obtained in Example 1 is applied to a high-power LED device, the luminance of the high-power LED device may be increased, and the power consumption thereof may be reduced.

It may also be recognized that total light transmittance of the obtained cured material was 87.5% and a transparent cured material may be obtained even when the zirconia particles are included.

Comparative Example 1

First, the zirconia particle dispersion coated with the first curable silicone resin and the non-curable silicone resin obtained in Synthesis Example 1 and the zirconia particle dispersion coated with the non-curable silicone resin obtained in Synthesis Example 3, was mixed. Except for the mixing, Comparative Example 1 follows the same sequence as Example 1.

In Comparative Example 1, a transparent gel material was obtained, but it was in a gel state even when heated to 150° C.

As set forth above, according to exemplary embodiments of the present disclosure, a curable silicone resin composition containing an inorganic oxide may include a first inorganic oxide particle having a first curable silicone resin bonded to a surface of the first inorganic oxide particle by a first functional group for surface bonding and a second inorganic oxide particle having a second curable silicone resin bonded to a surface of the second inorganic oxide particle by a second functional group for surface bonding. The first curable silicone resin may have a first crosslinkable functional group, and the second curable silicone resin may have a second crosslinkable functional group. As an example, an average primary particle diameter of each of the first and second inorganic oxide particles may range from 1 nm to 40 nm. Thus, the curable silicone resin composition containing an inorganic oxide may be cured by crosslinking the first curable silicone resin to the second curable silicone resin by bonding the first crosslinkable functional group to the second crosslinkable functional group. The first and second inorganic oxide particles may be bonded by the first and second curable silicone resins. Thus, inorganic oxide particles having nanometer scale sizes may be uniformly dispersed in a silicone resin at a relatively high concentrations.

Further, an optical member according to an exemplary embodiment may be obtained by curing the abovementioned curable silicone resin composition containing an inorganic oxide by bonding the first crosslinkable functional group to the second crosslinkable functional group. Since the inorganic oxide particles having nanometer scale sizes may be uniformly dispersed in the silicone resin at the relatively high concentration, an optical member having a relatively high refractive index and excellent optical transparency may be obtained.

While exemplary embodiments have been shown and described above, it will be apparent to those skilled in the art that modifications and variations may be made without departing from the scope of the present disclosure as further defined by the claims below.

What is claimed is:

1. A curable silicone resin composition containing an inorganic oxide comprising:
   a first curable silicone resin comprising a first functional group for surface bonding and a first crosslinkable functional group;
   a second curable silicone resin comprising a second functional group for surface bonding and a second crosslinkable functional group;
   a first inorganic oxide particle comprising the first curable silicone resin bonded to a surface of the first inorganic oxide particle by the first functional group for surface bonding; and
   a second inorganic oxide particle comprising the second curable silicone resin bonded to a surface of the second inorganic oxide particle by the second functional group for surface bonding,
   wherein the first crosslinkable functional group and the second crosslinkable functional group are each capable of bonding via applied energy, and an average primary particle diameter of each of the first inorganic oxide particle and the second inorganic oxide particle is from 1 nm to 40 nm,
   further comprising a non-curable silicone resin comprising a third functional group for surface bonding,
   wherein the non-curable silicone resin is bonded to a surface of at least one of the first inorganic oxide particle and the second inorganic oxide particle by the third functional group for surface bonding.

2. The curable silicone resin composition of claim 1, further comprising a catalyst that promotes bonding of the first crosslinkable functional group to the second crosslinkable functional group.

3. The curable silicone resin composition of claim 2, wherein the first crosslinkable functional group and the second crosslinkable functional group are, respectively, a hydrosilyl group and a vinyl group, and wherein the catalyst promotes a hydrosilylation reaction.

4. The curable silicone resin composition of claim 3, wherein the catalyst comprises platinum (Pt).

5. The curable silicone resin composition of claim 1, wherein the third functional group for surface bonding is a carboxylic group, a sulfonyl group, or a phosphate group.

6. The curable silicone resin composition of claim 1, wherein the non-curable silicone resin comprises a plurality of resins having different molecular weights.

7. The curable silicone resin composition of claim 1, wherein the first crosslinkable functional group and the second crosslinkable functional group are, respectively, at least one of a hydrosilyl group and a vinyl group, an epoxy group and an acid anhydride group, or an acrylic group and an acrylic group.

8. The curable silicone resin composition of claim 1, wherein at least one of the first functional group for surface bonding and the second functional group for surface bonding is a carboxylic group, a sulfonyl group, or a phosphate group.

9. The curable silicone resin composition of claim 1, wherein at least one of the first inorganic oxide particle and the second inorganic oxide particle comprises at least one selected from the group consisting of zirconia, titania, ceria, and barium titanate.

10. The curable silicone resin composition of claim 9, wherein the first inorganic oxide particle and the second inorganic oxide particle consist of the same inorganic oxide.

11. The curable silicone resin composition of claim 1, wherein the applied energy comprises applied heat.

12. An optical member, obtained by curing the curable silicone resin composition containing an inorganic oxide as recited in claim 1 by bonding the first crosslinkable functional group to the second crosslinkable functional group.

13. The optical member of claim 12, wherein a volume ratio of each of the first inorganic oxide particle and the second inorganic oxide particle is equal to or greater than 10 vol % of the optical member.

14. The optical member of claim 12, wherein total light transmittance of the optical member in a wavelength from 400 nm to 800 nm is equal to or greater than 80%.

15. The curable silicone resin composition of claim 1, further comprising a catalyst that promotes bonding of the first crosslinkable functional group to the second crosslinkable functional group.

16. A curable silicone resin composition containing an inorganic oxide comprising:
   a first curable silicone resin comprising a first functional group for surface bonding and a first crosslinkable functional group;
   a second curable silicone resin comprising a second functional group for surface bonding and a second crosslinkable functional group;
   a first inorganic oxide particle comprising the first curable silicone resin bonded to a surface of the first inorganic oxide particle by the first functional group for surface bonding; and
   a second inorganic oxide particle comprising the second curable silicone resin bonded to a surface of the second inorganic oxide particle by the second functional group for surface bonding,
   wherein the first crosslinkable functional group and the second crosslinkable functional group are each capable of bonding via applied energy, and an average primary particle diameter of each of the first inorganic oxide particle and the second inorganic oxide particle is from 1 nm to 40 nm,
   wherein at least one of the first functional group for surface bonding and the second functional group for surface bonding is a carboxylic group, a sulfonyl group, or a phosphate group.

17. The curable silicone resin composition of claim 16, further comprising a non-curable silicone resin comprising a third functional group for surface bonding,
   wherein the non-curable silicone resin is bonded to a surface of at least one of the first inorganic oxide particle and the second inorganic oxide particle by the third functional group for surface bonding.

18. The curable silicone resin composition of claim 16, wherein the first crosslinkable functional group and the second crosslinkable functional group are, respectively, at least one of a hydrosilyl group and a vinyl group, an epoxy group and an acid anhydride group, or an acrylic group and an acrylic group.

19. The curable silicone resin composition of claim 16, wherein at least one of the first inorganic oxide particle and the second inorganic oxide particle comprises at least one selected from the group consisting of zirconia, titania, ceria, and barium titanate.

20. A curable silicone resin composition containing an inorganic oxide comprising:
   a first curable silicone resin comprising a first functional group for surface bonding and a first crosslinkable functional group;
   a second curable silicone resin comprising a second functional group for surface bonding and a second crosslinkable functional group;
   a first inorganic oxide particle comprising the first curable silicone resin bonded to a surface of the first inorganic oxide particle by the first functional group for surface bonding; and
   a second inorganic oxide particle comprising the second curable silicone resin bonded to a surface of the second inorganic oxide particle by the second functional group for surface bonding,
   wherein the first crosslinkable functional group and the second crosslinkable functional group are each capable of bonding via applied energy, and an average primary particle diameter of each of the first inorganic oxide particle and the second inorganic oxide particle is from 1 nm to 40 nm,
   further comprising a catalyst that promotes bonding of the first crosslinkable functional group to the second crosslinkable functional group,
   wherein the first crosslinkable functional group and the second crosslinkable functional group are, respectively, a hydrosilyl group and a vinyl group, and wherein the catalyst promotes a hydrosilylation reaction.

* * * * *